United States Patent
Thommes

(10) Patent No.: US 6,239,407 B1
(45) Date of Patent: *May 29, 2001

(54) METHOD AND APPARATUS FOR RECEIVING A UNIVERSAL INPUT VOLTAGE IN A WELDING POWER SOURCE

(75) Inventor: James M. Thommes, Escondido, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/200,058

(22) Filed: Nov. 25, 1998

Related U.S. Application Data

(63) Continuation of application No. 08/779,044, filed on Jan. 6, 1997, now Pat. No. 6,002,103, which is a continuation of application No. 08/342,378, filed on Nov. 18, 1994, now Pat. No. 5,601,741.

(51) Int. Cl.$^7$ ...................................................... B23K 9/10
(52) U.S. Cl. ................................. 219/130.21; 219/137 PS
(58) Field of Search ........................... 219/130.21, 130.1, 219/130.51, 137 PS; 307/66; 363/142, 143

(56) References Cited

U.S. PATENT DOCUMENTS

| | | |
|---|---|---|
| 3,815,009 | 6/1974 | Berger . |
| 4,540,892 | 9/1985 | Carvalho . |
| 4,845,607 | 7/1989 | Nakao et al. . |
| 4,876,433 | 10/1989 | Kashima et al. . |
| 4,904,843 | 2/1990 | Hori et al. . |
| 4,963,715 | 10/1990 | Tuttle . |
| 5,162,984 | 11/1992 | Castagnet et al. . |
| 5,272,313 | 12/1993 | Karino et al. . |
| 5,319,533 | 6/1994 | Reynolds et al. . |
| 5,343,017 | 8/1994 | Karino et al. . |
| 5,601,741 | 2/1997 | Thommes . |

FOREIGN PATENT DOCUMENTS

| | | |
|---|---|---|
| 4128175A1 | 8/1991 | (DE) . |
| 4211906A1 | 4/1992 | (DE) . |
| 4411227A1 | 3/1994 | (DE) . |
| 410088 B1 | 12/1992 | (EP) . |

Primary Examiner—Clifford C. Shaw
(74) Attorney, Agent, or Firm—George R. Corrigan

(57) ABSTRACT

A method and apparatus for providing a welding current is disclosed. The power source is capable of receiving any input voltage over a wide range of input voltages and includes an input rectifier that rectifies the ac input into a dc signal. A dc voltage stage converts the dc signal to a desired dc voltage and an inverter inverts the dc signal into a second ac signal. An output transformer receives the second ac signal and provides a third ac signal that has a current magnitude suitable for welding. The welding current may be rectified and smoothed by an output inductor and an output rectifier. A controller provides control signals to the inverter and an auxiliary power controller that can receive a range of input voltage and provide a control power signal to the controller.

23 Claims, 5 Drawing Sheets

METHOD AND APPARATUS FOR RECEIVING A UNIVERSAL INPUT VOLTAGE IN A WELDING POWER SOURCE

This new application is a continuation of, and claims the benefit of the filing date of, U.S. patent application Ser. No. 08/779,044, filed Jan. 6, 1997, entitled Method And Apparatus For Receiving A Universal Input Voltage In A Welding Power Source, which issued on Dec. 14, 1999 as Pat. No. 6,002,103, which is a continuation of, and claims the benefit of the filing date of, U.S. patent application Ser. No. 08/342,378 filed Nov. 18, 1994, entitled Method And Apparatus For Receiving A Universal Input Voltage In A Welding Power Source, which issued on Feb. 11, 1997, as Pat. No. 5,601,741.

FIELD OF THE INVENTION

This invention generally relates to power sources. More particularly, this invention relates to inverter power sources employed in welding, cutting and heating applications.

Power sources typically convert a power input to a necessary or desirable power output tailored for a specific application. In welding applications, power sources typically receive a high voltage alternating current (VAC) signal and provide a high current output welding signal. Around the world, utility power supplies (sinusoidal line voltages) may be 200/208V, 230/240V, 380/415V, 460/480V, 500V and 575V. These supplies may be either single-phase or three-phase and either 50 or 60 Hz. Welding power sources receive such inputs and produce an approximately 10–40 volt dc high current welding output.

Welding is an art wherein large amounts of power are delivered to a welding arc which generates heat sufficient to melt metal and to create a weld. There are many types of welding power sources that provide power suitable for welding. Some prior art welding sources are resonant converter power sources that deliver a sinusoidal output. Other welding power sources provide a squarewave output. Yet another type of welding power source is an inverter-type power source.

Inverter-type power sources are particularly well suited for welding applications. An inverter power source can provide an ac square wave or a dc output. Inverter power sources also provide for a relatively high frequency stage, which provides a fast response in the welding output to changes in the control signals.

Generally speaking, an inverter-type power source receives a sinusoidal line input, rectifies the sinusoidal line input to provide a dc bus, and inverts the dc bus and may rectify the inverted signal to provide a dc welding output. It is desirable to provide a generally flat, i.e. very little ripple, dc bus. Accordingly, it is not sufficient to simply rectify the sinusoidal input; rather, it is necessary to also smooth, and in many cases alter the voltage of, the input power. This is called preprocessing of the input power.

There are several types of inverter power sources that are suitable for welding. These include boost power sources, buck power sources, and boost-buck power sources, which are well known in the art.

Generally, a welding power source is designed for a specific power input. In other words, the power source cannot provide essentially the same output over the various input voltages. Further, components which operate safely at a particular input power level are often damaged when operating at an alternate input power level. Therefore, power sources in the prior art have provided for these various inputs by employing circuits which can be manually adjusted to accommodate a variety of inputs. These circuits generally may be adjusted by changing the transformer turns ratio, changing the impedance of particular circuits in the power source or arranging tank circuits to be in series or in parallel. In these prior art devices, the operator was required to identify the voltage of the input and then manually adjust the circuit for the particular input.

Generally, adapting to the various voltage inputs in the prior art requires that the power source be opened and cables be adjusted to accommodate the particular voltage input. Thus, the operator was required to manually link the power source so that the appropriate output voltage was generated. Operating an improperly linked power source could result in personal injury, power source failure or insufficient power.

Prior art devices accommodated this problem by configuring the power source to operate at two different VAC input levels. For example, U.S. Pat. No. 4,845,607, issued to Nakao, et al. on Jul. 4, 1989, discloses a power source which is equipped with voltage doubling circuits that are automatically activated when the input is on the order or 115 VAC, and which is deactivated when the input is on the order of 230 VAC. Such sources are designed to operate at the higher voltage level, with the voltage doubling circuit providing the required voltage when the input voltage is at the lower level. This type of source, which uses a voltage doubling circuit, must use transistors or switching devices as well as other components capable of withstanding impractical high power levels to implement the voltage doubling circuit. Further, the circuitry associated with the voltage doubling circuit inherently involves heat dissipation problems. Also, the voltage doubling circuit type of power source is not fully effective for use in welding applications. Thus, there exists a long felt need for a power source for use in welding applications which can automatically be configured for various VAC input levels.

Welding power sources are generally known which receive a high VAC signal and generate a high current dc signal. A particularly effective type of the power source for welding applications which avoids certain disadvantages of the voltage doubling circuit type of power source generally relies on a high frequency power inverter. Inverter power sources convert high voltage dc power into high voltage AC power. The AC power is provided to a transformer which produces a high current output.

Power inverters for use over input voltage ranges are generally known in the art. For example, a power inverter which is capable of using two input voltage levels is disclosed in U.S. Pat. No. 3,815,009, issued to Berger on Jun. 4, 1974. The power inverter of that patent utilizes two switching circuits; the two switching circuits are connected serially when connected to the higher input voltage, but are connected in parallel to account for the lower input voltage. The switching circuits are coupled to each other by means of lead wires. This inverter is susceptible to operator errors in configuring the switching circuits for the appropriate voltage level, which can result in power source malfunction or human injury.

Other prior art welding sources that improved upon manual linking provided an automatic linkage. For example, the Miller Electric AutoLink is one such power source and is described in U.S. Pat. No. 5,319,533 incorporated herein by reference. Such power sources test the input voltage when they are first connected and automatically set the proper linkage for the input voltage sensed. Such welding power sources, if portable, are generally inverter-type power sources, and the method by which linking is accomplished is by operating the welding power source as two inverters. The inverters may be connected in parallel (for 230V, for example) or in series (e.g., for 460V). Such arrangements generally allow for two voltage connection possibilities. However, the higher voltage must be twice the lower voltage. Thus, such a power source cannot be connected to supplies ranging from 230V–460V to 380V–415V or 575V.

A 50/60 Hz transformer could be used to provide multiple paths for various input voltages. It would, however, have the disadvantage of being heavy and bulky compared to an inverter-type welding power source of the same capacity. In addition, if it was automatically linked as in the Miller AutoLink example given above, it would have to have link apparatus for each voltage. Such an automatic linkage would be complicated and probably uneconomical for the range of voltages contemplated by this invention. Thus, it is unlikely that prior art power sources that automatically select the proper of two input voltage settings will accommodate the full range of worldwide electrical input power. This shortcoming may be significant in that many welding power sources are purchased to be transportable from site to site. The ability to automatically adapt to a number of input power voltage magnitudes is thus advantageous.

It is, therefore, one object of this invention to provide a welding power source that receives any of the above-mentioned input voltages, or any other input voltage, without the need of any linkages, whether manual or automatic. Additionally, it is desirable to have such a welding power source that incorporate inverter technology and without using high power 50/60 Hz transformers.

SUMMARY OF THE INVENTION

The present invention is a power source that is capable of receiving any input voltage over a wide range of input voltages. The power source includes an input rectifier that rectifies the ac input into a dc signal. A dc voltage stage converts the dc signal to a desired dc voltage and an inverter inverts the dc signal into a second ac signal. An output transformer receives the second ac signal and provides a third ac signal that has a desired current magnitude. Although not necessary, the output current may be rectified and smoothed by an output inductor and an output rectifier. A controller provides control signals to the inverter and an auxiliary power controller is capable of receiving a range of input voltages and provides a control power signal to the controller.

A method for providing a welding current includes rectifying an ac input and providing a first dc signal. The first dc signal is then converted into a second ac signal. Then the second ac signal is converted into a third ac signal that has a current magnitude suitable for welding. The welding current may then be rectified and smoothed to provide a dc welding current and an auxiliary power signal is supplied at a preselected control power signal voltage, regardless of the magnitude of the ac input signal.

DETAILED DESCRIPTION OF THE PREFERRED EMBODIMENT

Figure 1:
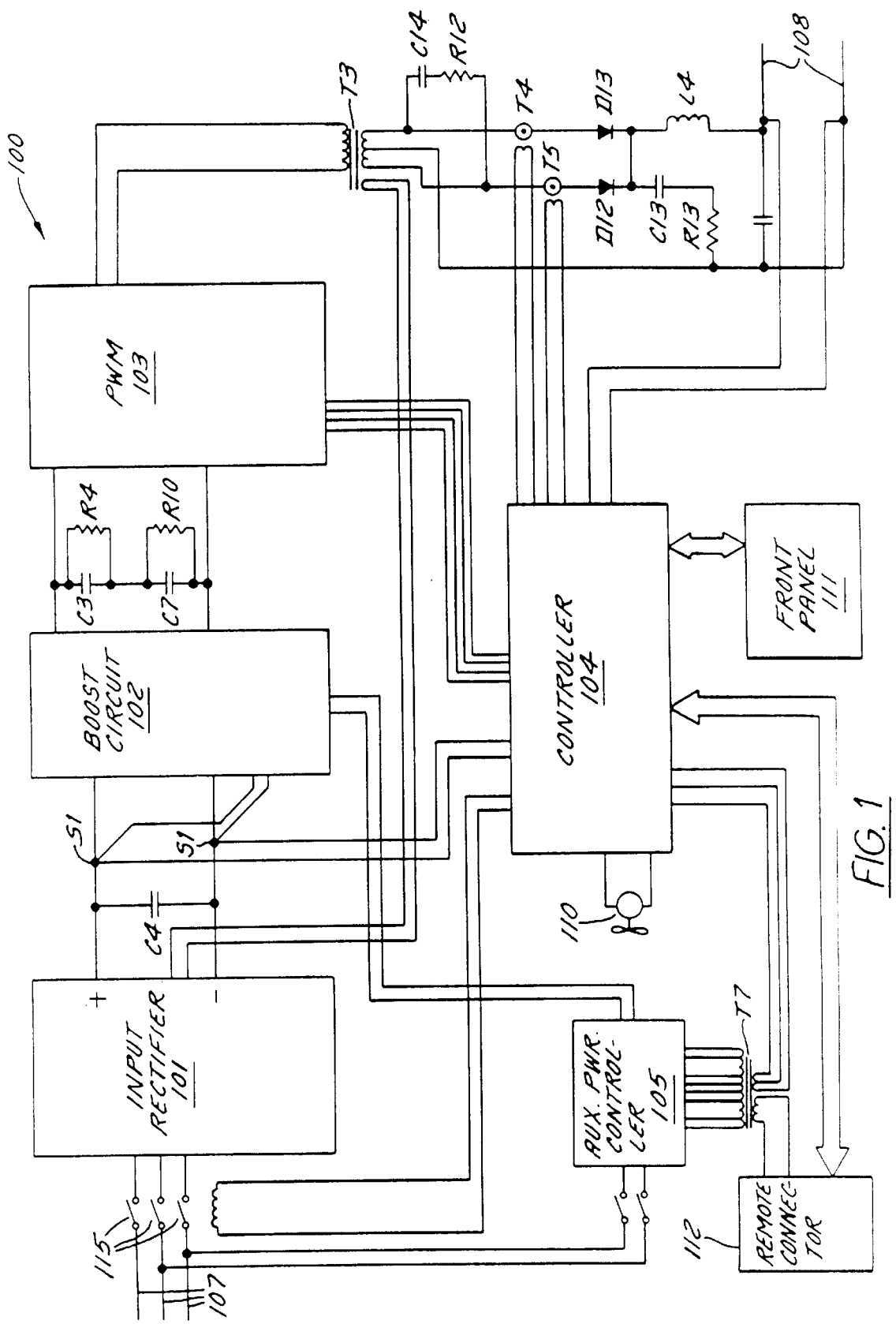
FIG. 1 is a block diagram of the preferred embodiment of the present invention.

Referring now to FIG. 1, the welding power source 100 includes an input rectifier 101, a boost circuit 102, a pulse-width modulator 103, a controller 104, an auxiliary power controller 105, a pair of storage capacitors C3 and C7, and their associated protective resistors R4 and R10, and output transformer T3, an output inductor L4, feedback current transformers T4 and T6, feedback capacitors and resistors C13, C14, R12 and R13, and output diodes D12 and D13 to provide a welding output current on welding output terminals 108. A cooling fan 110, a front panel 111, and a remote connector 112 are also shown schematically.

In operation, power source 100 receives a three-phase line voltage on input lines 107. The three-phase input is provided to input rectifier 101. Input rectifier 101 rectifies the three-phase input to provide a generally dc signal. A 10 microfarad capacitor C4 is provided for high frequency decoupling of the boost circuit. The dc signal has a magnitude of approximately 1.35 times the magnitude of the three-phase input. The decoupled dc bus is provided to boost circuit 102. As will be described in greater detail below, boost circuit 102 processes the dc bus provided by input rectifier 101 to provide a dc output voltage having a controllable magnitude. In the preferred embodiment the output of boost circuit 102 will be approximately 800 volts, regardless of the input voltage.

The output of boost circuit 102 is provided to pulse-width modulator 103, where the dc bus is inverted and pulse-width modulated to provide a controllable signal suitable for transforming into a welding output. Controller 104 is a main control board such as that found in many inverter-type welding power sources. The main control board provides the control signals to pulse-width modulator 103, to control the frequency and pulse-width of pulse-width modulator 103. Input rectifier 101, pulse-width modulator 103, controller 104 and output transformer T3 are well known in the art.

The output of pulse-width modulator 103 is provided to an output transformer T3, which, transforms the output of PWM 103 to provide a voltage and current suitable for welding. Transformer T3 has a center tap secondary and is provided with a turns ratio of 32 turns on the primary to 5 turns on each half for the center tap secondary. Of course, other transformers may be used. The alternating output of transformer T3 is rectified and smoothed by an output inductor L4 and output diodes D12 and D13. Inductor L4 has an inductance sufficient to provide desirable welding characteristics, such as, for example, in a range of 50–150 microhenrys.

Auxiliary power controller 105 receives the input line voltage and converts that voltage to a 18 volt dc control signal. The 18 volt control signal is created regardless of the input voltage, and is provided to boost circuit 102. Boost circuit 102 uses the 18 volt control signal to control its switching frequency and the magnitude of its output. Auxiliary power controller 105 also provides a 48 volt center tap ac power signal to controller 104.

Front panel 104 is shown schematically and is used to convey operating status to the user, as well as receive inputs as to operating parameters. Similarly, remote connector 112 is shown schematically and is used to receive inputs as to operate parameters.

Generally speaking, at power-up a three phase input is provided on input lines 107. A plurality of initially open contactors 115 isolates the input power from input rectifier 101. However, the input power is provided to auxiliary power controller 105. As will be described in greater detail below, auxiliary power controller 105 determines the magnitude of the input power, and opens or closes a number of contacts to provide a 48 volt center tap ac output to controller 104, regardless of the input. The contacts are closed and opened in such a way as to provide safeguards against underestimating the magnitude of the input voltage, and thus protecting the circuit components. Also, auxiliary power controller 105 provides an 18 volt dc control signal to boost circuit 102, regardless of the magnitude of the input.

After the voltage level has been properly determined by closing the proper contacts controller 104 causes contacts 115 to be closed, thus providing power to input rectifier 101. Input rectifier 101 includes a precharge circuit to prevent a resonant overcharge from harming capacitors C3 and C7 and to avoid excessively loading of the input source. A signal received by input rectifier 101 from a tap on transformer T3 turns on an SCR (described in more detail below). The conducting SCR bypasses input current around the precharge resistors.

The output of input rectifier 101 is provided to boost circuit 102. Boost circuit 102 is well known in the art and integrated circuit controllers for boost circuits may be purchased commercially. In operation boost circuits 102 senses the voltage at its inputs and its outputs. As will be described in more detail later and IGBT (or other switching element) is switched on and off at a frequency and duty cycle (or pulse width) to obtain a desired output voltage. In the preferred embodiment the desired output voltage is approximately 800 volts.

Boost circuit 102 thus provides an output of about 800 volts to 800 microfarad electrolytic capacitors C3 and C7, and have 45K ohm bleeder and balancing resistors R4 and R7 associated therewith. Capacitors C3 and C7 thus acts as a dc link for PWM 103.

PWM 103 receives a generally constant 800 dc signal and modulates it to provide, after transformation, rectification and smoothing, a welding output at a user selected magnitude. PWM 103 modulates its input in accordance with control signals received from controller 104. PWM 103 also receives a 25 volt dc power signal from controller 104. Such a PWM is well known and PWM 103 may be purchased commercially as a single module.

The output of PWM 103 is provided to output transformer T3 and which transforms the relatively high voltage, low current signal to a voltage suitable for use in welding. The output of transformer T3 is rectified by diodes D12 and D13, and smoothed by output inductor L4. Thus, a generally constant magnitude dc welding output is provided on welding outputs 108.

Current transformers T4 and T5, provide feedback signals to controller 104, snubber capacitors C13 (0.1 microfarads) and C14 (0.022 microfarads), and snubber resistors R12 (12 ohms) and R13 (47 ohms) suppress voltage transients associated with recovery of D12 and D13. Controller 104 compares the feedback signals to the desired welding current, and appropriately controls PWM 103 to adjust its switching pulse width if necessary.

Figure 2:
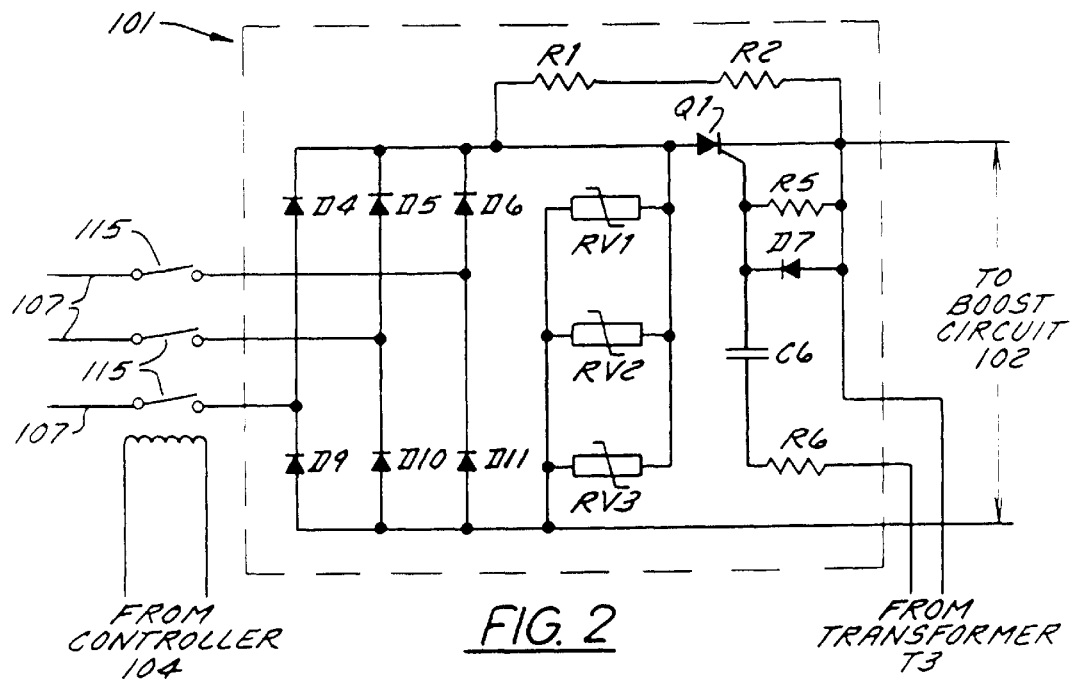
FIG. 2 is a detailed diagram of the input rectifier of FIG. 1.

Referring now to FIG. 2, the preferred embodiment for input rectifier 101 is shown in detail and includes a full wave bridge comprised of diodes D4, D5, D6, D9, D10 and D11. The bridge rectifies the three phase input to provide a signal having a magnitude of about 1.35 times the input voltage magnitude. A pair of 50 ohm resistors R1 and R2 are provided to precharge capacitors C4, C3 and C7 (shown in FIG. 1) upon start up. This prevents a sudden surge of current from being dumped into capcitors C4, C3 and C7.

After the precharge is completed an SCR Q1 is turned on via a signal from a tap on output transformer T3 (also in FIG. 1). The signal from transformer T3 is provided to the gate of SCR Q1 via a current limiting resistor R6 and capacitor C6. A recovery diode D7 and snubber resistor R5 are provided across the gate of SCR Q1. SCR Q1 shunts the resistors and allows the maximum current flow to inductor L2 of boost circuit 102.

A plurality of varistors RV1–RV3 are provided to suppress line spikes. Additional varistors (not shown) may be provided between D9–D11 and ground to further suppress spikes.

As one skilled in the art will readily recognize, other circuits and circuit elements will accomplish the function of input rectifier 101.

Figure 3:
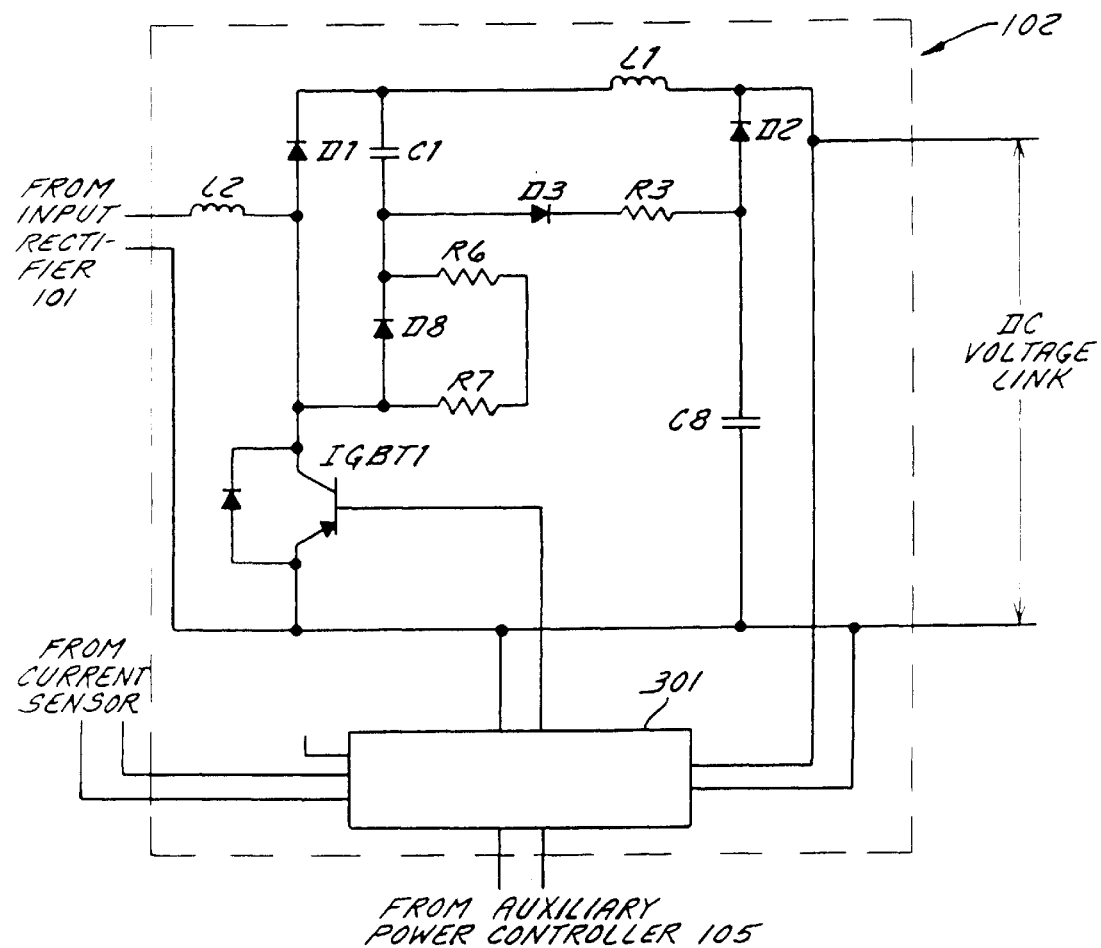
FIG. 3 is a detailed diagram of the boost circuit of FIG. 1.
Figure 4:
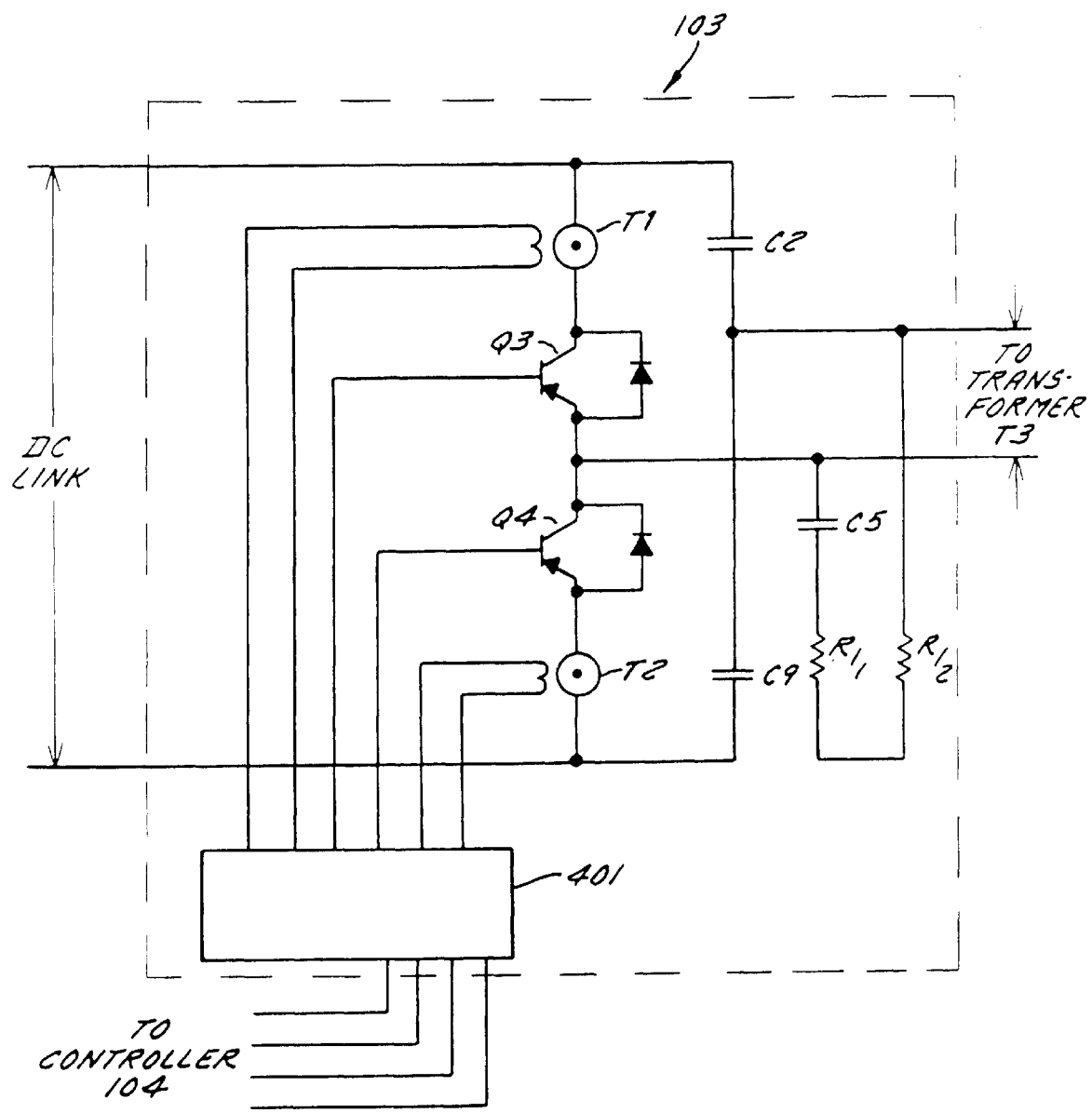
FIG. 4 is a detailed diagram of the pulse width modulator of FIG. 1.

Referring now to FIG. 3, the details of one embodiment of boost circuit 102, which operates in a manner well known in the art, is shown. Generally speaking, boost circuit 102 provides an output voltage that is equal to the input voltage divided by one minus the duty cycle of a switch IGBT1 in boost circuit 102.

Thus, if the switch IGBT1 is off 100% of the time the output voltage (the dc link voltage) is equal to the input voltage (from capacitor C4 and input rectifier 101). In one embodiment the lowest input is about 200 volts, and the desired output (dc link voltage) is 800 volts, thus the upper limit for the "boost" is about 400%, and requires a duty cycle of about 75%.

The operation of a boost circuit should be well known in the art and will be briefly described herein. When switch IGBT1 is turned on, current flows through an inductor L2 to the negative voltage bus, thus storing energy in inductor L2. When switch IGBT1 is subsequently turned off, the power is returned from inductor L2 through a diode D1 and a 14 microhenry saturable reactor L1 to the dc link. The amount of energy stored versus returned is controlled by controlling the duty cycle in accordance with the formula stated above. In order for the boost circuit to operate properly inductor L2 must have continuous current, therefore inductor L2 should be chosen to have a large enough inductance to have a continuance current over the range of duty cycles. In one embodiment inductor L2 is a 3 millihenry inductor. The remaining elements of boost circuit 102 include a 0.0033 microfarad capacitor C1, a diode D3, a 1 ohm resistor R3, a 50 ohm resistor R6, a diode D8, a 50 ohm resistor R7 and a 0.1 microfarad capacitor C8 which are primarily snubbers and help the diode recover when switch IGBT1 is turned on.

Boost circuit 102 includes an IGBT driver 301 that controls the duty cycle of switch IGBT1. Driver 301 receives feedback signals indicative of the output voltage and the input current, and utilizes this information to drive switch IGBT1 at a duty cycle sufficient to produce the desired output voltage.

In one embodiment, boost circuit 102 includes a shunt S1 (shown in FIG. 1). Shunt S1 provides a feedback signal that is the current flowing in the positive and negative buses. A Unitrode power factor correction chip is used to implement boost circuit 102 in the preferred embodiment and requires average current flow as an input. In response to this information and the dc link voltage, driver 301 turns switch IGBT1 on and off.

As one skilled in the art will readily recognize, other circuits and circuit elements will accomplish the function of boost circuit 102.

As stated above, the output of boost circuit 102 is provided to capacitors C3 and C7 (FIG. 1) and is the dc link voltage. In one embodiment the dc link voltage is 800 volts, as determined by the switching of switch IGBT1. In the preferred embodiment, using the component values described herein the dynamic regulation of the dc link voltage is 80 volts from full load to no load. Static regulation is about a +/−2 volts, with a ripple of about +/−20 volts.

The dc link voltage is provided to pulse width modulator 103. PWM 103 is a standard pulse with modulator and provides a quasi-square wave output having a magnitude equal to the magnitude of the input, as would any other PWMs. Thus, the output of PWM 103 is about +400 volts to −400 volts for an 800 volt peak to peak centered about zero.

PWM 103 includes a pair of switches Q3 and Q4 (preferably IGBTs) and a pulse width driver 401. Driver 401 receives feedback from current transformers T1 and T2, and receives control inputs from controller 104. In response to these inputs driver 401 provides gate signals to switches Q3 and Q4, thereby modulating the input signal. A capacitor C2 (4 microfarad) a capacitor C9 (4 microfarad) are provided between the dc link and the output transformer T3. A capacitor C5 (0.0022 microfarad), resistor R11 (50K ohm) and resistor R9 (50K ohm) are snubber circuits.

As one skilled in the art will readily recognize, other circuits and circuit elements will accomplish the function of PWM 103.

The output of PWM 103 is provided to transformer 103, and the current in transformer 103 is determined by the modulation of PWM 103. As stated above, the output of transformer T3 is rectified by diodes D12 and D13 and is smoothed by inductor L4. The dc output current is fairly flat; the ripple at full load (300 amps) is about 12 amps peak to peak. At full load the duty cycle of each switch Q3 and Q4 of PWM 103 would be about 20–35% (40–70% overall duty cycle).

In an alternative embodiment the output of PWM 103 may be rectified by other output rectifiers such as a synchronous rectifier (cycloconverter) that provides an ac output signal at a frequency less than or equal to the frequency of the output of PWM 103. Other output circuits, including inverters, that provide a welding current may also be used.

Referring again to FIG. 1, controller 104 is connected to current transformers T4 and T5, which provide feedback information. Controller 104 receives power from auxiliary power controller 105 and provides as one of its output the driver control for the PWM driver. It also includes an over voltage protection sense which monitors the voltage coming out of input rectifier 101. If the voltage from input rectifier 101 is dangerously high controller 104 causes contactors 115 to open, to protect circuit components. According to one embodiment 930 volts dc is the cut off point for what is considered to a dangerously high voltage.

As may be seen from the above description, welding power source 100 receives an input voltage and provides a welding output. Regardless of the magnitude of the input voltage boost circuit 102 boosts the input voltage to a desired (800 volts e.g.) level. Then PWM 103 modulates the signal to provide an appropriate level of power, at 800 volts, to transformers T3.

The above arrangement is satisfactory for any input voltage, however, there must be some mechanism to provide control voltages at the proper level. As will be described below, auxiliary power controller 105 performs that function, and the embodiment thereof is shown schematically in FIG. 5.

Figure 5A:
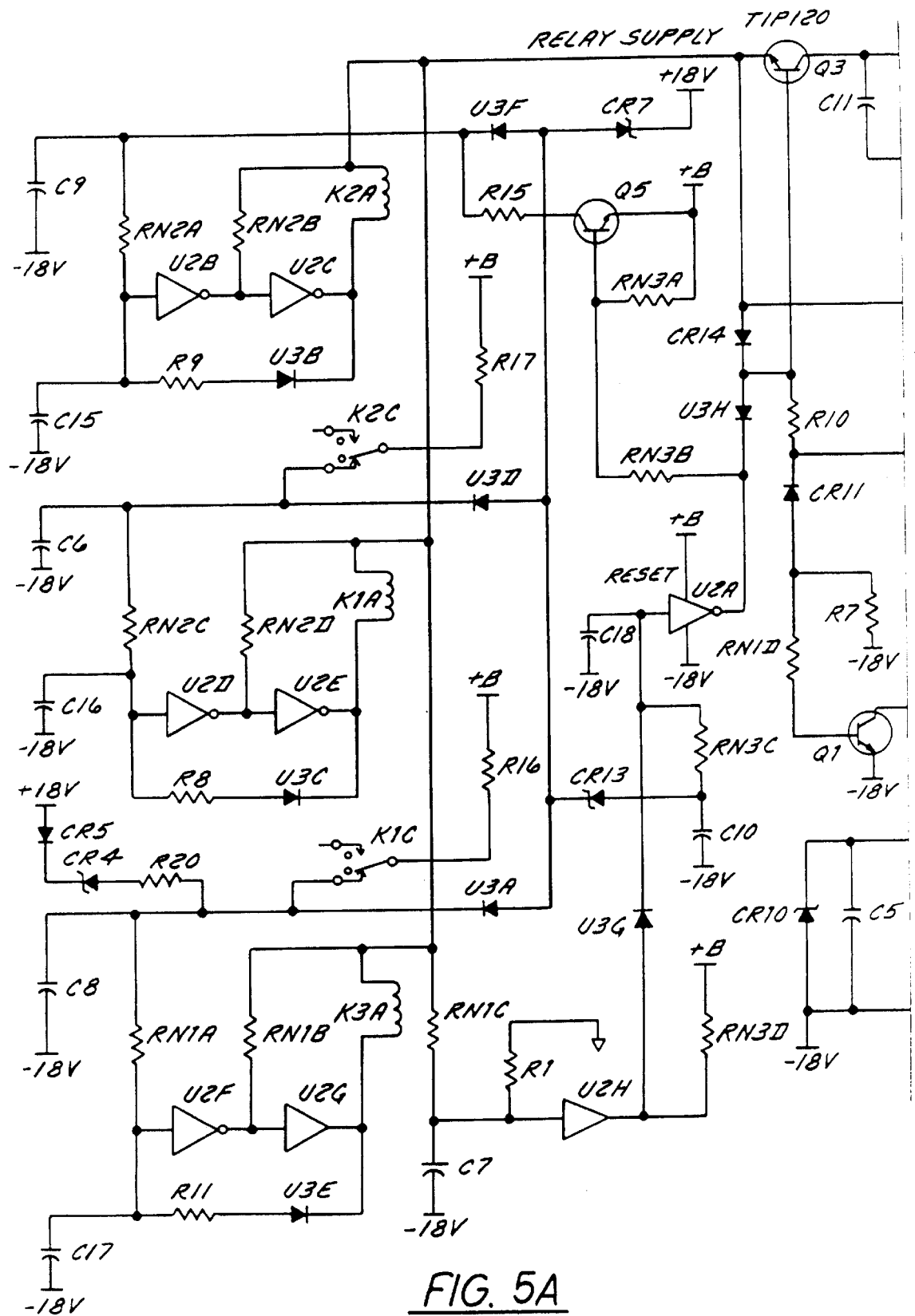
FIG. 5 is a control circuit for the auxiliary power controller of the present invention.
Figure 5B:
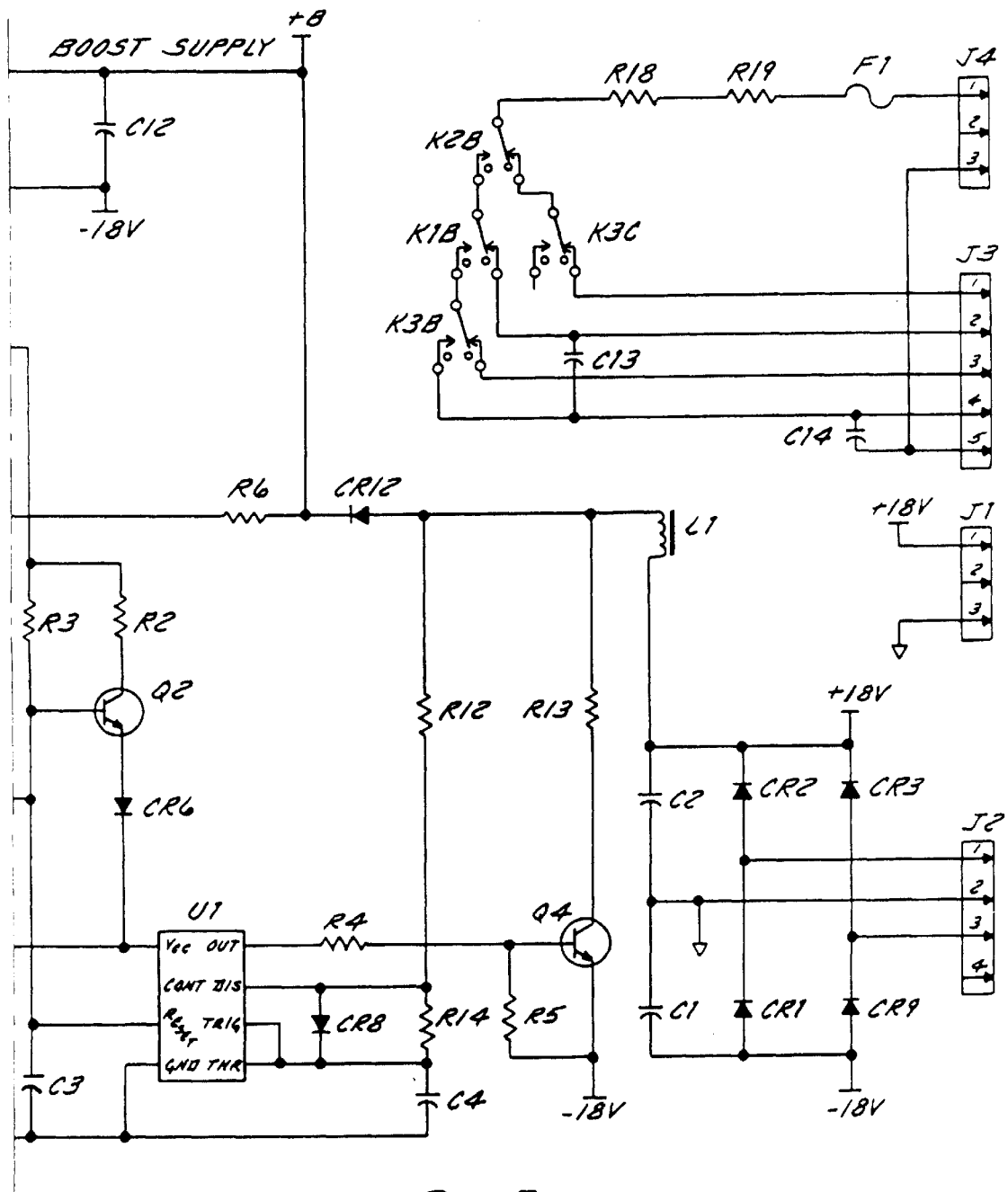

With reference now to FIG. 5, a plurality of connectors J1, J2, J3 and J4 are shown. An 18 volt dc control voltage output is provided on connector J1 to boost circuit 102 (shown on FIG. 1). As will be described in greater detail below, the 18 volt dc control signal is provided regardless of the magnitude of the input voltage. Connector J2 feeds power back to auxiliary power controller 105 for internal use. Connector J3 connects the input ac voltage to appropriate taps on a transformer T7 (FIG. 1) to provide a 30 volt ac signal to remote connector 112 (FIG. 1). Similarly, a 48 volt center tap ac signal is provided to controller 104. Controller 104 uses the 48 volt center tap ac signal to generate dc control signals and to power fan 110. Connector J4 of auxiliary power controller 105 is connected via a user controlled on/off switch S4 to the input power lines (FIG. 1).

Auxiliary power controller 105 controls the connections to taps on the primary of an auxiliary power transformer T7. Transformer T7 is a 200 VA transformer whose primaries are connected to auxiliary power controller 105 as described above with reference to connector J2 and J3. Several taps on its secondary are connected to controller 104 and the remaining secondary taps are connected to remote connector 112.

Referring again to FIG. 5, the taps on J3 are associated with the following voltages: 575, 460, 380, 230 volts, and the return, beginning at the uppermost tap and proceeding downward. As will be described below, when auxiliary power controller 105 selects the appropriate tap for a given input voltage, transformer T7 will provide a 48 volt center tap ac signal on its secondary for use by controller 104.

As may be seen on FIG. 5, the ac input is received on connector J4 and provided (via a fuse F1, and a pair of 4.7 ohm resistors R18 and R19) to a series of relays K2B, K1B, K3C and K3B that determines the tap on connector J3 selected for the output. When 575 volts are present at the input relays K2B and K3C should be to the right. Then the input is connected across the upper and lower most taps on connector J3. These taps are connected to the appropriate taps on transformer T7 such that the output of transformer T7 that is provided to controller 104 is approximately 48 volts center tap when 575 volts are provided to the primary of transformer T7.

When 460 volts are present at the input relay K2B should be to the left, and relay K1B should be to the right. This connects the ac input to the second uppermost and the lowest taps on connector J3. The remaining voltages are similarly accommodated. A pair 0.15 microfarad capacitors C13 and C14 are provided for snubbing and spike suppression as the primaries of transformer T7 are switched.

In operation the circuitry on the left side of FIG. 5 determines the input voltage, and sets the relays for that voltage. At start up the relays are as shown in FIG. 5 and are suitable for an input voltage of 575 volts. Because this is the highest possible input voltage, all components will be protected, i.e. either the voltage is properly selected, or the input voltage is less than the component design capabilities. If auxiliary power controller 105 determines that 575 volts are in fact present, the relays will remain as shown. However, if auxiliary power controller 105 determines that less than 575 volts are present, the state of relay K2B will be changed (to be to the left), so that the output is appropriate for a 460 volt input.

This process is repeated, always stepping down to the next highest voltage, until the appropriate input voltage is sensed. In this manner the components in controller 104 will be protected from a dangerously high voltage being applied to controller 104.

The voltage for sensing is provided to auxiliary power controller 105 via connector J2, which is connected to secondary taps on transformer T7. Thus, if the tap selected on connector J3 was not correct, then the voltage on connector J2 will be too low, and auxiliary power controller 150 will select the appropriate relay setting to step down to the next voltage level. As stated above, the stepping down continues until the proper voltage is sensed on connector J2.

The input from connector J2 is provided to a rectifier comprised of diodes CR1, CR2, CR3 and CR4. These diodes rectify the ac signal and provide it to a pair of 220 microfarad smoothing capacitors C1 and C2. The rectified voltage is +/-18 volts if the proper tap on connector J3 is selected. If the incorrect tap is selected the voltage will be less than +/-18 volts, but will be referred to as nominally +/-18 volts. The nominal +/-18 volt supply is provided at other locations throughout the auxiliary power controller 105 circuit, including to a 30 volt zener diode CR7, used to determine if the proper tap on connector J3 has been selected.

Auxiliary power controller 105 determines if 575 volts is present on the input using the following components: zener diode CR7, a 10 microfarad capacitor C9, a pair of gates U2B and U2C configured as darlington drivers for a winding K2A of relay K2, a 10K ohm resistor RN2A, a 10K ohm resistor RN2B, a 820 ohm resistor R9, and a diode U3B. Gates U2B and U2C are also used as sensing devices and have a threshold of about 4 volts (relative to their reference voltages) on the input (pin 1) of gate U2B pin 1.

Initially, gate U2B has a LOW output and is referenced to nominal -18 volts. Gate U2B will not switch states so long as the input is at least 4 volts greater than its reference voltage (nominally -18 volts relative to ground). In operation the nominal +18 volts will be provided to diode CR7 and the nominal -18 volt signal is applied to a 10 microfarad capacitor C9. As a result of the 30 volt zener drop, the input to gate U2B will be at -12 volts (relative to ground) if the proper tap has been selected. If 575 volts are present at the input, there will be 6 volts relative to the reference voltage (-18 volts) at the input to op amp U2B, and the output state of gate U2B of gate U2B will remain low. So long as the output of U2B remains low the current will not flow in the winding of relay K2 and relay K2B will remain as shown in FIG. 5.

However, if only 460 volts are present on the input and the relays are as shown in FIG. 5 (as they will be at power up), then the nominal +/-18 volts will actually be +/-14.4 volts. Thus, 28.8 volts are applied across zener diode CR7 and capacitor C9. Given the 30 volt zener drop, -14.4 volts will be applied to the input of gate U2B. Because this is also the reference voltage for gate U2B, the threshold is crossed, and the output of gate U2B will change states. Current will then flow in the winding of relay K2 and relay K2B will change states, configuring the J3 taps for 460 volts. If less than 460 volts is present at the input the same result will occur.

The sensing and stepping down to 380 volts and 230 volts occur in a similar manner using similar components. Referring to FIG. 5, the sense and step down circuit to 380 volts include a 100 ohm resistor R17, a pair of 10K ohm resistors RN2C and RN2D, and 820 ohm resistor R8, a diode U3C, a 10 microfarad capacitor C6, a pair of gates U2D and U2E, and a winding K1A for relay K1. A relay K2C is provided to prevent relay K1 from changing states before the step down to 460 volts occurs. In the manner described above with respect to the step down to 460 volts, the current will be provided to winding K1A of relay K1 if less than 460 volts is provided at the input. This will cause relay K1B to move to the left position and connect the tap on J3 associated with a 380 volt input.

The circuitry associated with the step down to 230 volts includes a 100 ohm resistor R16, a pair of 10K ohm resistors RN1A and RN1B, and 820 ohm resistor R11, a diode U3E, a pair of gates U2F and U2G, a winding K3A for relay K3, relay K1C, diode CR6 and zener diode CR4. A relay K1C is provided to prevent relay K3 from changing states before the step down to 380 volts occurs. The step down to 230 volts operates in the same manner as the step down to 380 volts and 460 volts as described above. If less than 380 volts is applied on the connector J4 inputs, gates U2F and U2G will cause current to flow through winding K3A of relay K3. This will cause relay K3B to move to the left and connect the tap on J3 for 230 volts to the ac input.

Thus, as may seen from the above description, the circuitry of auxiliary power controller 105 senses the ac input voltage and connects the appropriate tap on the auxiliary power transformer T7 to the ac input voltage. As may be seen from the above discussion, this is done in a manner which protects components by assuming the voltage is, upon start up, the highest possible voltage. If the voltage is less than the highest possible voltage, the next lowest voltage will then be assumed. This process is repeated until the actual voltage is obtained.

In the event that the ac input is 230 volts, at start up there will not be sufficient power from the nominal +/-18 volt signal to drive the relays because the tap associated with 575 volts on connector J3 is selected at start up. To compensate for this, circuitry that boosts the voltage supplied on connector J2 is provided. This circuitry includes a 1 millihenry inductor L1, a switch Q4, a timer U1, a switch Q2, a switch Q1, and a switch TIP120. Also included are associated circuitry including a 22 ohm shunt resistor R13, a 1K resistor R5, a 10K resistor R12, a 10K resistor R14, a 2.2K resistor R4, a 1K resistor R6, a 1K resistor R2, a 20K resistor R3, a 200 ohm resistor R7, a 10K resistor RN1D, a 4.7K resistor R10, a 470 picofarad capacitor C4, a 0.001 microfarad capacitor C3, a 0.1 microfarad capacitor C5, a 220 microfarad capacitor C11, a 220 microfarad capacitor C12, a diode CR12, a diode CR8, a zener diode CR10, a diode CR5, and a zener diode CR11.

The boost power source circuitry operates as a typical boost circuit. The boost is provided by inductor L1 and switch Q4. During the time switch Q4 is ON, current flows through inductor L1, shunt resistor R13 and switch Q4 to the negative voltage supply. During this time, energy is stored in inductor L1. When switch Q4 is OFF, the energy stored in inductor L1 is returned to the positive voltage supply (+B) through diode CR12. By appropriate timing of the turning ON and OFF of switch Q4, a desired voltage may be obtained. Timer chip U1 is used to provide the ON/OFF gate signals to switch Q4 and is an LM555 timer. When the voltage on resistor R13 becomes sufficiently high, it will trip the input on U1, which in turn will cause the output of timer U1 to turn switch Q4 OFF.

Initially, switch Q4 is in the ON position and current increases and eventually reaches the point where the voltage on resistor R13 is sufficiently high to trip the threshold on timer U1 through resistor R12. Thus, switch Q4 will remain ON for a length of time sufficient to build up enough energy to, when it is turned OFF, raise the nominal +/-18 volts to a level sufficient to drive the relays.

Switches Q2 and Q1 enable or disable timer U1 when the taps on connector J3 are such that the nominal +/-18 volts signal is actually +/-18 volts. When switch Q2 is turned OFF, timer U1 is disabled through its VCC input. Also, switch TIP120 is a linear regulator. When the nominal +18 volt supply is insufficient to drive the relay, switch TIP120 will provide the boost source to drive the relays. When the nominal +18 voltage is sufficient to drive the relay, switch Q2, timer U1 and switch Q4 are turned off. The +18 volt supply is coupled through L1 and CR12 to regulator TIP120; the +B boost supply is then fed directly by the sufficiently high +18 volt supply. The TIP120 regulator regulates relay supply at 24 volts relative to the −18 volt supply.

In addition to the circuitry above, circuitry is provided that protects in the event of an overvoltage. This circuitry includes a switch Q5, a gate U2A, a 100 ohm resistor R15, a 10K ohm resistor RN3A, a 10K ohm resistor RN3B, a 10K ohm resistor RN3C, a 10 microfarad capacitor C10, diodes CR14 and U3H, and 10 volt zener diode CR13. An overvoltage occurs when the tap selected on connector J3 correspond to a voltage less than the voltage at the ac input. This may occur when either the incorrect tap has been selected or when a temporarily high voltage is provided at the ac input.

In the event an overvoltage occurs, the voltage at the node common to diodes CR13 and CR7 will rise to a voltage greater than 14 volts with respect to the nominal −18 volt signal. This causes the low side of diode CR13 to be greater than 4 volts with respect to the nominal −18 volt signal, and the input of U2A will change from an input low state to an input high state. When the input of U2A changes from low to high, the output will change from an output high state to an output low state. The output low state of U2A will bring the relay supply voltage to a virtual 0 through diodes U3H and CR14. This causes the relays to return to the state shown in FIG. 2, which accommodates the highest voltage possible (575 volts). At that time the previously described tap selection process stepping from the 575 to 460 to 380 to 230 taps begins again until the correct tap is selected to match the input voltage received on connector J4. Accordingly, the components of controller 104 will be protected.

Other modifications may be made in the design and arrangement of the elements discussed herein without departing from the spirit and scope of the invention as expressed in the appended claims.

I claim:

1. A welding, cutting or heating power source capable of receiving a range of input voltages, comprising:
   an input rectifier configured to receive an ac input and to provide a first dc signal;
   a converter configured to receive the first dc signal and to provide a converter output, and configured to receive at least one control input;
   an output transformer configured to receive the converter output and to provide a third ac signal having a current suitable for welding, cutting or heating;
   an output circuit configured to receive the third ac signal and to provide a welding signal; and
   a controller, including a power factor correction circuit, configured to provide at least one control signal to the converter.

2. The apparatus of claim 1, further including an auxiliary power source capable of providing a control power signal at a preselected control signal voltage, regardless of the magnitude of the ac input signal.

3. The apparatus of claim 2, further including an auxiliary transformer with a plurality of primary taps, wherein the auxiliary power controller is in electrical communication with the plurality of primary taps.

4. The apparatus of claim 1, wherein the converter includes a boost circuit.

5. The apparatus of claim 1, wherein the converter includes a pulse width modulator.

6. The apparatus of claim 1, wherein the range of input voltages is 230 volts to 575 volts.

7. The apparatus of claim 1 wherein the output circuit includes a rectifier.

8. The apparatus of claim 1 wherein the output circuit includes a cycloconverter.

9. A method of providing a welding, cutting or heating current from a range of input voltages, comprising:
   converting and power factor correcting an ac input signal to a second ac signal; and
   transforming the second ac signal into a third ac signal having a current suitable for welding, cutting or heating.

10. The method of claim 9, wherein the converting the ac input signal includes of converting the ac signal to a dc signal and inverting the dc signal to provide the second ac signal.

11. The method of claim 10, wherein inverting includes the step of pulse width modulating.

12. The method of claim 10 further including rectifying the third ac signal.

13. The method of claim 10 further including cycloconverting the third ac signal.

14. The method of claim 9 further including providing control signals to an inverter.

15. The method of claim 9, including providing auxiliary power signal by transforming the ac input signal.

16. A welding, cutting or heating power source for providing a welding, cutting or heating current from a range of input voltages, comprising:
    rectifier means for receiving an ac input and providing a first dc signal;
    converting means for converting and power factor correcting the dc signal to a second ac signal;
    transforming means for transforming the second ac signal into a third ac signal having a current suitable for welding, cutting or heating; and
    output means for providing a welding, cutting or heating current.

17. The apparatus of claim 16, wherein the means for converting includes means for converting the dc signal to a second dc signal and means for inverting the second dc signal to provide the second ac signal.

18. The apparatus of claim 16 further including means for providing control signals to an inverter.

19. The apparatus of claim 16, further including means for providing an auxiliary power signal and for transforming the ac input signal into the auxiliary power signal.

20. The apparatus of claim 16, wherein the means for converting the dc signal to a second dc signal includes means for boosting the voltage.

21. The apparatus of claim 16, wherein the means for inverting includes means for pulse width modulating.

22. The apparatus of claim 16, wherein the output means includes means for rectifying the third ac signal.

23. The apparatus of claim 16, wherein the output means includes means for cycloconverting the third ac signal.

* * * * *

(12) EX PARTE REEXAMINATION CERTIFICATE (7106th)
United States Patent
Thommes

(10) Number: US 6,239,407 C1
(45) Certificate Issued: *Oct. 13, 2009

(54) METHOD AND APPARATUS FOR RECEIVING A UNIVERSAL INPUT VOLTAGE IN A WELDING POWER SOURCE

(75) Inventor: James M. Thommes, Escondido, CA (US)

(73) Assignee: Illinois Tool Works, Inc., Glenview, IL (US)

Reexamination Request:
No. 90/008,371, Feb. 5, 2007
No. 90/009,051, Jun. 5, 2008

Reexamination Certificate for:
Patent No.: 6,239,407
Issued: May 29, 2001
Appl. No.: 09/200,058
Filed: Nov. 25, 1998

(*) Notice: This patent is subject to a terminal disclaimer.

(51) Int. Cl.
*H02M 5/458* (2006.01)
*H02M 5/00* (2006.01)
*B23K 9/095* (2006.01)

(52) U.S. Cl. .......................... 219/130.21; 219/137 PS
(58) Field of Classification Search .................. None
See application file for complete search history.

(56) References Cited

U.S. PATENT DOCUMENTS

| | | | |
|---|---|---|---|
| 3,614,592 A | 10/1971 | Redfern |
| 4,437,146 A | 3/1984 | Carpenter |
| 4,493,040 A | 1/1985 | Vanderhelst |
| 4,521,672 A | 6/1985 | Fronius |
| 4,533,986 A | 8/1985 | Jones |
| 4,677,366 A | 6/1987 | Wilkinson et al. |
| 4,688,162 A | 8/1987 | Mutch et al. |
| 5,149,933 A | 9/1992 | Donner |
| 5,179,842 A | 1/1993 | Kanazawa |
| 5,272,313 A | 12/1993 | Karino et al. |
| 5,319,533 A | 6/1994 | Reynolds et al. |
| 5,343,017 A | 8/1994 | Karino et al. |
| 5,349,284 A | 9/1994 | Whittle |
| 5,363,020 A | 11/1994 | Chen et al. |
| 5,406,051 A | 4/1995 | Lai |
| 5,446,641 A | 8/1995 | Reynolds et al. |
| 5,465,011 A | 11/1995 | Miller et al. |

FOREIGN PATENT DOCUMENTS

| | | |
|---|---|---|
| DE | 42 11 906 C1 | 6/1993 |
| DE | 42 11 906 C 1 | 9/1993 |
| EP | 410088 | 1/1991 |
| GB | 2 213 614 A | 8/1989 |
| GB | 2258958 A | 2/1993 |
| GB | 2 258 958 A | 2/1993 |
| JP | 55-120485 | 9/1980 |
| JP | 355120845 A | 9/1980 |
| JP | 59-174277 A | 10/1984 |
| JP | S59-220285 | 12/1984 |
| JP | S62-107868 | 5/1987 |
| JP | H1-215465 | 8/1989 |
| JP | 1-215465 A | 8/1989 |
| JP | H2-41778 | 2/1990 |
| JP | 2-41778 A | 2/1990 |

OTHER PUBLICATIONS

Power Factor Control ML4812, Micro Linear, Jun. 1989.

(Continued)

*Primary Examiner*—Anjan K Deb

(57) ABSTRACT

A method and apparatus for providing a welding current is disclosed. The power source is capable of receiving any input voltage over a wide range of input voltages and includes an input rectifier that rectifies the ac input into a dc signal. A dc voltage stage converts the dc signal to a desired dc voltage and an inverter inverts the dc signal into a second ac signal. An output transformer receives the second ac signal and provides a third ac signal that has a current magnitude suitable for welding. The welding current may be rectified and smoothed by an output inductor and an output rectifier. A controller provides control signals to the inverter and an auxiliary power controller that can receive a range of input voltage and provide a control power signal to the controller.

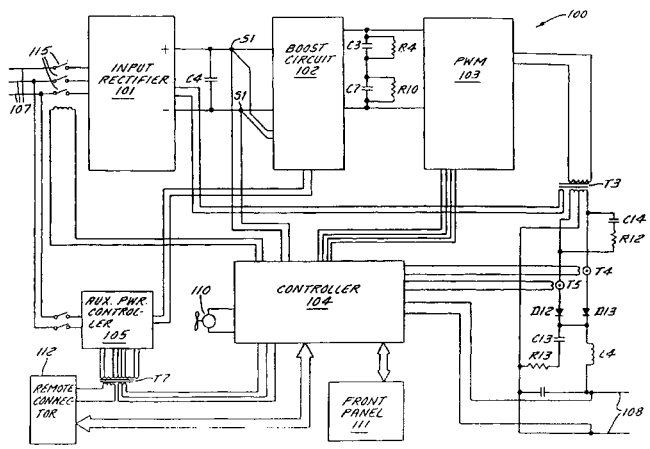

OTHER PUBLICATIONS

Cardinale, Vince, "Techniques for Improving Power Factor", Powertechnics Magazine, Apr. 1990.

Dixon, Lloyd, "Optimizing the Design of a High Power Factor Switching Preregulator", Topic 7, Unitrode Corporation, 1990.

Alberkrack, Jade H. and Steven M. Barrow, Power Factor Controller IC Minimizes External Components, PCIM, Feb. 1993.

Machin, Nigel, and Vescovi, Tino, Very High Efficiency Techniques and Their Selective Application to the Design of a 70A Rectifier, Rectifier Technologies, 1993, pp. 126–133, Intelec Conf. Rec.

Panov, Y.V., et al., Design Issues for a Zero–Voltage–Switched Power Factor Correction Circuit and DC/DC Converter Power Processing Unit, Proceedings of the Virginia Power Electronics Seminar, Sep. 19–21, 1993, pp. 65–78, Blacksburg, VA.

Jiang, Y.M. et al., A Novel Single–Phase Power Factor Correction Scheme, Proceedings of the Applied Power Electronics Specialist Conference, Mar. 7–11, 1993, pp. 153–158, San Diego, CA.

Jiang and Lee, Single–Stage Single–Phase Parallel Power Factor Correction Scheme, Proceedings of the Power Electronics Specialist Conference, Jun. 20–25, 1994, pp. 159–166, Taipei, Taiwan.

Jovanovic et al., Reduction of Voltage Stress in Integrated High–Quality Rectifier–Regulators by Variable Frequency Control, Applied Power Electronics Conference, Feb. 13–17, 1994, pp. 145–152, Orlando, FL.

Dixon, Lloyd H., Jr., High Power Factor Preregulators for Off–Line Power Supplies, 1988, pp. 6–1 through 6–16.

Neufield, Herman "Control IC for Near Unity Power Factor in SMPS," Power Conversion, published Oct. 1989, pp. 110–119.

Brown, Marty "Power Supply Cookbook," Butterworth–Heinemann, published 1994, pp. 195–198.

Mammano, Bob et al. "Improving Input Power Factor—A New Active Controller Simplifies the Task," Power Conversion, published Oct. 1989, pp. 100–109.

Dixon, Jr. Lloyd H. "High Power Factor Preregulators for Off–Line Power Supplies," High Power Factor Preregulators, Unitrode Corporation, published Dec. 1990, pp. 6–1–6–15.

Sum, K. Kit "Power Factor and Its Effect on Power Quality," Power Conversion, Published Oct. 1989, pp. 74–87.

Nalbant, Mehmet et al. "Design Of A 1KW Power Factor Correction Circuit," Power Conversion, published Oct. 1989, pp. 121–134.

Mammano, Bob et al. "Choose the Optimum Topology for High Power Factor Supplies," Power Electronics, published Mar. 1991, pp. 8–18.

Nelson, Carl "The LT1248 Power–Factor Corrector," Linear Technology Magazine, Published Jun. 1993, pp. 3–5.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 10, 16–18 and 21–23 are cancelled.

Claims 1, 2, 9, 11–13, 15, 19 and 20 are determined to be patentable as amended.

Claims 3–8 and 14, dependent on an amended claim, are determined to be patentable.

New claims 24–32 are added and determined to be patentable.

1. A welding, cutting or heating power source capable of receiving a range of input voltages, comprising:
   an input rectifier configured to receive an ac input and to provide a first dc signal *at a rectified magnitude*;
   a converter configured to receive the first dc signal and to provide a converter output *and providing a dc bus at a desired magnitude, wherein the desired magnitude is greater than the rectified magnitude of a greatest input in the range of input voltages*, and configured to receive at least one control input;
   an output transformer configured to receive the converter output and to provide a third ac signal having a current suitable for welding, cutting or heating;
   an output circuit configured to receive the third ac signal and to provide a welding signal; and
   a controller, including a power factor correction circuit, configured to provide at least one control signal to the converter.

2. [The apparatus of claim 1,] *A welding, cutting or heating power source capable of receiving a range of input voltages, comprising:*
   *an input rectifier configured to receive an ac input and to provide a first dc signal;*
   *a converter configured to receive the first dc signal and to provide a converter output, and configured to receive at least one control input;*
   *an output transformer configured to receive the converter output and to provide a third ac signal having a current suitable for welding, cutting or heating;*
   *an output circuit configured to receive the third ac signal and to provide a welding signal;*
   *a controller, including a power factor correction circuit, configured to provide at least one control signal to the converter; and*
   further including an auxiliary power source capable of providing a control power signal at a preselected control signal voltage, regardless of the magnitude of the ac input signal.

9. A method of providing a welding, cutting or heating current from a range of input voltages, comprising:
   converting and power factor correcting an ac input signal to a second ac signal [and] , *including converting the ac signal to a dc signal having a desired magnitude and inverting the dc signal to provide the second ac signal*;
   transforming the second ac signal into a third ac signal having a current suitable for welding, cutting or heating; *and*
   *deriving auxiliary power from the ac input signal using a first set of circuitry prior to the dc signal reaching the desired magnitude, and a second set of circuitry used after the dc signal reaches the desired magnitude for at least one input in the range of input voltages, and providing the auxiliary power at a preselected voltage.*

11. The method of claim [10] *9*, wherein inverting includes the step of pulse width modulating.

12. The method of claim [10] *9* further including rectifying the third ac signal.

13. The method of claim [10] *9* further including cycloconverting the third ac signal.

15. The method of claim 9, including providing *the* auxiliary power *as an auxiliary power* signal by transforming the ac input signal.

19. [The apparatus of claim 16,] *A welding, cutting or heating power source for providing a welding, cutting or heating current from a range of input voltages, comprising:*
   *rectifier means for receiving an ac input and providing a first dc signal;*
   *converting means for converting and power factor correcting the dc signal to a second ac signal;*
   *transforming means for transforming the second ac signal into a third ac signal having a current suitable for welding, cutting or heating; and*
   *output means for providing a welding, cutting or heating current; and*
   further including means for providing an auxiliary power signal *at a preselected voltage* and for transforming the ac input signal into the auxiliary power signal.

20. [The apparatus of claim 16] *A welding, cutting or heating power source for providing a welding, cutting or heating current from a range of input voltages, comprising:*
   *rectifier means for receiving an ac input and providing a first dc signal;*
   *converting means for converting and power factor correcting the dc signal to a second ac signal;*
   *transforming means for transforming the second ac signal into a third ac signal having a current suitable for welding, cutting or heating; and*
   *output means for providing a welding, cutting or heating current; and*
   wherein the means for converting the dc signal to a second dc signal includes means for boosting the voltage.

*24. The apparatus of claim 2, wherein the converter includes an intermediate dc bus that is provided at a desired magnitude after start up, and further wherein the auxiliary power source includes a first set of circuitry used prior to the dc bus reaching the desired magnitude, and a second set of circuitry used after the dc bus reaches the desired magnitude for at least one input in the range of inputs.*

*25. The apparatus of claim 24, wherein the desired magnitude is greater than a rectified magnitude of a greatest input in the range of input voltages.*

*26. The apparatus of claim 1, further comprising a precharge circuit disposed between the ac input and the converter output, and further comprising a precharge bypass current path that is not closed until after the control signal is at a preselected control signal voltage.*

27. The apparatus of claim 1, wherein the controller receives as an input a signal indicative of the ac input.

28. The apparatus of claim 1, further comprising a precharge circuit disposed between the ac input and the converter output, wherein the precharge circuit has a precharge control input responsive to the controller.

29. The method of claim 9, wherein the desired magnitude is greater than a rectified magnitude of a greatest input in the range of input voltages.

30. The method of claim 9, further comprising precharging prior to power factor correcting, and ending the precharging only after the auxiliary power is at the preselected voltage.

31. The method of claim 9, wherein the power factor correcting is done in response to a signal indicative of the ac input.

32. A welding, cutting or heating power source for providing a welding, cutting or heating current from a range of input voltages, comprising:

rectifier means for receiving an ac input and providing a first dc signal;

converting means for converting and power factor correcting the dc signal to a second ac signal;

transforming means for transforming the second ac signal into a third ac signal having a current suitable for welding, cutting or heating; and output means for providing a welding, cutting or heating current;

wherein the means for converting includes means for converting the dc signal to a second dc signal and means for inverting the second dc signal to provide the second ac signal;

means for deriving an auxiliary power signal from the ac input and for providing the auxiliary power signal at a preselected voltage;

means for precharging the converting means; and means for ending the precharging only after an auxiliary power signal is at a preselected voltage.

* * * * *